United States Patent
Jang et al.

(10) Patent No.: US 6,505,288 B1
(45) Date of Patent: Jan. 7, 2003

(54) MATRIX OPERATION APPARATUS AND DIGITAL SIGNAL PROCESSOR CAPABLE OF PERFORMING MATRIX OPERATIONS

(75) Inventors: Ho-rang Jang, Yongin (KR); Hyun-woo Park, Yongin (KR); Jin-ckuc Cho, Yongin (KR)

(73) Assignee: Samsung Electronics Co., Ltd. (KR)

( * ) Notice: Subject to any disclaimer, the term of this patent is extended or adjusted under 35 U.S.C. 154(b) by 128 days.

(21) Appl. No.: 09/638,951

(22) Filed: Aug. 16, 2000

(30) Foreign Application Priority Data

Dec. 17, 1999 (KR) .......................................... 99-58763

(51) Int. Cl.[7] .............................................. G06F 12/00
(52) U.S. Cl. ........................ 711/220; 711/217; 711/218
(58) Field of Search ................................. 708/200, 232, 708/233, 441, 520, 670; 711/220, 217, 218, 219, 214; 345/501, 506, 522

(56) References Cited

U.S. PATENT DOCUMENTS

| | | | | |
|---|---|---|---|---|
| 3,794,984 A | * | 2/1974 | Deerfield et al. | 712/11 |
| 4,150,434 A | * | 4/1979 | Shibayama et al. | 708/104 |
| 4,779,192 A | * | 10/1988 | Torii et al. | 708/441 |
| 4,823,258 A | * | 4/1989 | Yamazaki | 708/520 |
| 5,276,819 A | * | 1/1994 | Rau et al. | 711/214 |
| 5,732,251 A | * | 3/1998 | Bartkowiak | 708/200 |
| 6,115,812 A | * | 9/2000 | Abdallah et al. | 708/520 |
| 6,212,618 B1 | * | 4/2001 | Roussel | 345/522 |
| 6,314,505 B1 | * | 11/2001 | Nakashima et al. | 711/217 |
| 6,332,188 B1 | * | 12/2001 | Garde et al. | 712/204 |

OTHER PUBLICATIONS

Jang, Ho Rang et al., "A Digital Signal Processor For Low Power", AP–ASIC '99, The first IEEE Asia Pacific Conference on ASICs, Aug. 23–25, 1999, pp. 42–45.

* cited by examiner

Primary Examiner—Kevin L. Ellis
Assistant Examiner—Zhuo H. Li
(74) Attorney, Agent, or Firm—Burns, Doane, Swecker & Mathis, L.L.P.

(57) ABSTRACT

A digital signal processor capable of performing matrix operations, by which it is possible to use a method of matrix representation for the instruction level of the digital signal processor in order to effectively process a large amount of data, is provided. An apparatus included in the digital signal processor, for performing matrix operations, includes a data storage unit for storing operand data including matrix data in the form of a circular linked list and operation result data, an address generating unit for sequentially generating addresses required for performing matrix operations, the addresses including a series of addresses of first operand data, a series of addresses of second operand data, and a series of stored addresses of operation result data, whereby the addresses are sequentially generated according to the contents of the instruction words performed by the digital signal processor, and an operation unit for reading data positioned in the address generated by the data storage unit and performing operations according to the contents of the instruction words. It is possible to reduce the size of the program memory in the digital signal processor by providing a measure for effectively representing a digital signal processing algorithm. Accordingly, it is possible to reduce power consumption for reading the program memory, to thus allow electronic goods to be operated for a long time with small power consumption.

17 Claims, 17 Drawing Sheets

$$C = A \times B^t$$

$$c_{ij} = \sum_k a_{ik} \cdot b_{jk}$$

$$\begin{bmatrix} c_{11} & c_{12} & c_{13} \\ c_{21} & c_{22} & c_{23} \\ c_{31} & c_{32} & c_{33} \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} b_{11} & b_{12} & b_{13} \\ b_{21} & b_{22} & b_{23} \\ b_{31} & b_{32} & b_{33} \end{bmatrix}^t$$

FIG. 11

| INSTRUCTION | SYMBOL | DESCRIPTION |
|---|---|---|
| MULTA | $A \times B^t$ | MULTIPLICATION |
| ADDA | $A+B$ | ADDITION |
| SUBA | $A-B$ | SUBTRACTION |
| TRANSA | $A^t$ | TRANSPOSE |
| PRODA | $A \cdot B$ | PRODUCT |
| SCALA | $\alpha A$ | SCALAR MULTIPLICATION |
| STOREA | $M[\ ] \leftarrow A$ | STORE MATRIX |
| LOADA | $A \leftarrow M[\ ]$ | LOAD MATRIX |
| ISMV | $A[p] \leftarrow \#$ | MOVE IMMEDIATE DATA TO MATRIX |
| IGMV | $Rn \leftarrow A[p]$ | MOVE MATRIX ELEMENT TO GENERAL REGISTER |
| GIMV | $A[p] \leftarrow Rn$ | MOVE GENERAL REGISTER TO MATRIX |
| SETD | $I=\#, J=\#, K=\#$ | DEFINE THE DIMENSION OF MATRIX |

FIG. 12A
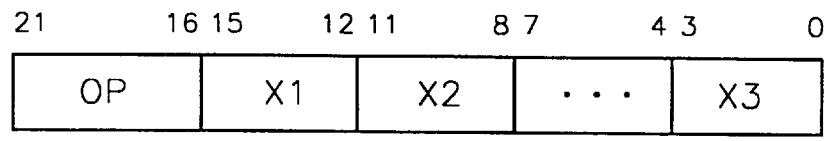
OP : MULTA, ADDA, SUBA, PRODA
FIG. 12B
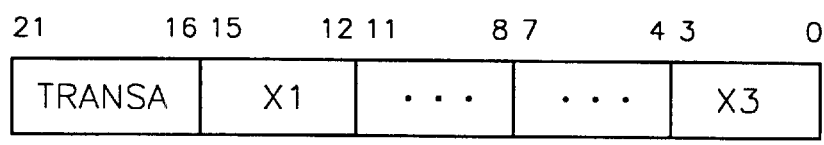
OP : TRANSA
FIG. 12C
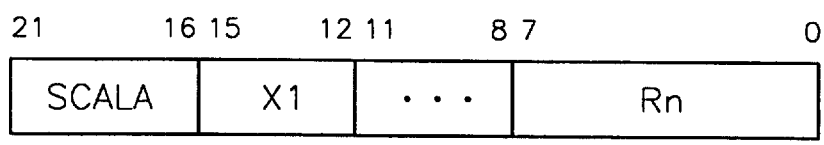
OP : SCALA
FIG. 12D
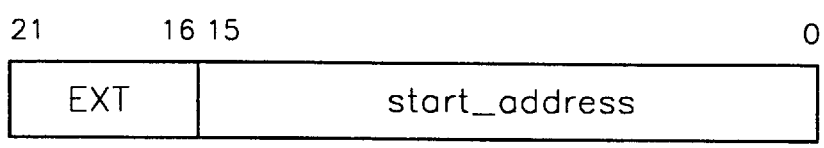
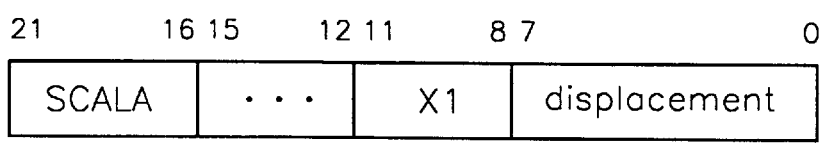
OP : STOREA

OP : LOADA

OP : IGMV

OP : GIMV

OP : ISMV

OP : ISMV

OP : SETD

OP : SETD

FIG. 13A $\vec{X}1 = \vec{X}2 \times \vec{X}3^t$
MULTA X1 X2 X3

$$X1 = \begin{bmatrix} 9 & 10 \\ 11 & 12 \end{bmatrix}$$

$$X2 = \begin{bmatrix} 1 & 2 \\ 3 & 4 \end{bmatrix}$$

$$X3 = \begin{bmatrix} 5 & 6 \\ 7 & 8 \end{bmatrix}$$

FIG. 13B

| data | 1 | 2 | 3 | 4 | 5 | 6 | 7 | 8 | 9 | 10 | 11 | 12 | 13 |
|---|---|---|---|---|---|---|---|---|---|---|---|---|---|
| address | 10 | 11 | 12 | | | | | | | | | | 23 |

FIG. 13C

| X1 | POS | MAX_POS |
|---|---|---|
| 18 | 0 | 3 |

| X2 | POS | MAX_POS |
|---|---|---|
| 10 | 0 | 3 |

| X3 | POS | MAX_POS |
|---|---|---|
| 14 | 0 | 3 |

FIG. 16

| ALGORITHM | NUMBER OF CORD WORDS | |
|---|---|---|
| | G-DSP | LP_DSP |
| Multiplication of 2 Vector | 22 | 3 |
| Adaptive 128 tap FIR filter | 37 | 9 |
| IIR filter | 13 | 5 |
| 128 point FFt | 1096 | 75 |
| 128 tap FIR filter | 476 | 12 |
| DIGITAL HEARING AIDS | 3643 | 980 |

MATRIX OPERATION APPARATUS AND DIGITAL SIGNAL PROCESSOR CAPABLE OF PERFORMING MATRIX OPERATIONS

This application claims priority under 35 U.S.C. §§119 and/or 365 to 99-58763 filed in REPUBLIC OF KOREA on Dec. 17, 1999; the entire content of which is hereby incorporated by reference.

BACKGROUND OF THE INVENTION

1 Field of the Invention

The present invention relates to an apparatus for operating on a large amount of data such as a digital signal processor or an operation apparatus for an electronic system, and more particularly, to an operation apparatus of a digital signal processor, capable of processing the instructions represented in a matrix form in order to process the large amount of data and a digital signal processor capable of performing matrix operations.

2. Description of the Related Art

Due to the development of the semiconductor industry, systems whose sizes are extremely small and which can be used for a long time with batteries of small capacity have appeared. In particular, power consumption and the sizes of the systems are the center of interest in a technical field such as personal radio communication systems and adhesive medical instruments, which includes hearing aids.

Digital signal processors, which process a large amount of data, have been significantly developed in the electronics industry, keeping pace with an information-oriented society. However, the power consumption of systems has been rapidly increased since the development has been achieved with priority to the improvement of the performance.

In general, data items are processed one by one in the digital signal processor. For example, when a 2×2 matrix multiplication represented in Equation 1 is done, a general micro processor processes the multiplications one by one.

$$\begin{bmatrix} R1 & R2 \\ R3 & R4 \end{bmatrix} = \begin{bmatrix} R5 & R6 \\ R7 & R8 \end{bmatrix} \times \begin{bmatrix} R9 & R10 \\ R11 & R12 \end{bmatrix}^t \quad (1)$$

Equation 1 is represented by a program performed by a general micro processor as follows.

CLR ACC
MULT R5 R9
ADD ACC R5
MULT R6 R10
ADD ACC R6
MV R1 ACC
CLR ACC
MULT R5 R11
ADD ACC R5
MULT R6 R12
ADD ACC R6
MV R2 ACC
CLR ACC
MULT R7 R9
ADD ACC R5
MULT R8 R10
ADD ACC R6
MV R3 ACC
CLR ACC
MULT R7 R11
ADD ACC R5
MULT R8 R12
ADD ACC R6
MV R4 ACC

In order to reduce the size of the above program, a "MAC" function of performing a multiplication and an addition in one clock period is added to a lot of digital signal processors. The program performed by the digital signal processors to which the "MAC" function is added is represented as follows. It is possible to reduce the time for performing the program and the size of the program by adding the "MAC" function.

CLR ACC
MAC R5 R9
MAC R6 R10
ADD ACC temp
MV R1 ACC
CLR ACC
MAC R5 R11
MAC R6 R12
ADD ACC temp
MV R2 ACC
CLR ACC
MAC R7 R9
MAC R8 R10
ADD ACC temp
MV R3 ACC
CLR ACC
MAC R7 R11
MAC R8 R12
ADD ACC temp
MV R4 ACC It is noted from the above program that only addresses increase and the "MAC" function is periodically repeated. In order to effectively process the program, a repeat statement, "RPT", and an automatic address increase function (for example, R5++) are used by conventional digital signal processors. Such functions can be effectively used for programs for operations such as matrix operations in which a plurality of repeat statements are required. The program to which the repeat statements and the automatic address increase functions are provided can be written as follows.

CLR ACC
RPT 2
MAC R5++ R9++
ADD ACC temp
MV R1 ACC
CLR ACC
RPT 2
MAC R5++ R11++
ADD ACC temp
MV R2 ACC
CLR ACC
RPT 2
MAC R7++ R9++
ADD ACC temp
MV R3 ACC CLR ACC
RPT 2
MAC R7++ R11++
ADD ACC temp
MV R4 ACC The size of the program performed by conventional digital signal processors is still large in spite of the above-mentioned improvements.

However, when the matrix is expressed using variables, the calculation of Equation 1 can be performed by only the following codes.

SETD 2 2 2
MULT X1 X2 X3

When a certain algorithm or a function is expressed by various instructions, a memory having a large capacity is required. Accordingly, a processor such as the digital signal processor consumes much power. This is because a significant amount of power consumed by the processor is consumed by the memory for reading the instructions.

Also, in a system using a built-in processor where the capacity of the instruction memory is limited and functions expressed by various instructions must be performed, all the required instructions may not be loaded in a chip. In this case, an external memory must be added and used for the system. Accordingly, more power is consumed. Therefore, when a certain function is expressed by various instructions, a time for which products can be used without recharge is reduced, the sizes of the products are enlarged and the prices of the products are raised, since various chips are used in portable electronic systems.

In a system which performs a vector operation such as a systolic array operation, it is possible to process a plurality of operations. In such a system, data items are processed at one time by including various operation apparatuses such as a multiplexer and an adder inside the chip. Such a method can improve the performance of the system, however, does not reduce the power consumption and the size of the chip. Also, the vector operation is effectively used for only some digital signal processing algorithms.

SUMMARY OF THE INVENTION

The present invention relates to a technology of guaranteeing a long operation time with a small amount of power consumption, which is essential for portability of electronic products. A large amount (between 50 and 80%) of power consumed by a processor such as a digital signal processor is consumed by a program memory for reading instructions. Since the power consumption by the memory is proportional to the size of the memory and the number of times that data is read from and written to the memory, it is necessary to reduce the number of times that data is read from the memory and the size of the memory in order to reduce the power consumption.

Since many signal processing algorithms can be simply expressed using a method of matrix representation, it is an object of the present invention to provide a matrix operation apparatus in a digital signal processor capable of reducing the size of the program memory and the number of times that instructions are read from the memory by applying the method of matrix representation for a method of data representation.

It is another object of the present invention to provide a digital signal processor capable of performing matrix operations.

Accordingly, to achieve the first object, there is provided an apparatus included in a digital signal processor, for performing matrix operations, comprising a data storage means for storing operand data comprising matrix data in the form of a circular linked list and operation result data, address generating means for sequentially generating addresses required for performing matrix operations, the addresses including a series of addresses of first operand data, a series of addresses of second operand data, and a series of stored addresses of operation result data, whereby the addresses are sequentially generated according to the contents of the instruction words performed by the digital signal processor, and an operation means for reading data positioned in the address generated by the data storage means and performing operations according to the contents of the instruction words.

The address generating means comprises a matrix address storage means for storing the addresses of the matrix data items in the form of the circular linked list and outputting a first matrix data address, a second matrix data address, and an operation result matrix data address according to the contents of the instruction words, an A address generator for receiving the first matrix data address from the matrix address storage means and sequentially generating the series of addresses of the first operand data according to the instruction words, a B address generator for receiving the second matrix data address from the matrix address storage means and sequentially generating the series of addresses of the second operand data according to the instruction words, and a C address generator for receiving the operation result matrix data address from the matrix address storage means and sequentially generating the series of stored addresses of the operation result data according to the instruction words.

To achieve the second object, there is provided a digital signal processor capable of performing matrix operations, comprising a program memory for storing a signal processing program, an instruction register for temporarily storing the instruction words fetched from the program memory, an instruction decoder for interpreting the instruction words stored in the instruction register and generating a control signal, a data storage means for storing operand data including matrix data in the form of a circular linked list and operation result data, an address generating means for sequentially generating the series of addresses of first operand data, the series of addresses of second operand data, and the series of stored addresses of operation result data, which are required for the matrix operation, according to the control signal, and an operation means for reading the data positioned at the address generated by the address generating means from the data storage means and performing operations according to the control signal.

The instruction decoder generates a control signal corresponding to a pipeline structure, comprising the steps of fetching the instruction words stored in the program memory and temporarily storing the fetched instruction words in the instruction register, generating the addresses of the first operand data and the addresses of the second operand data by the address generating means, reading the first operand data and the second operand data from the data storage means and moving the first operand data and the second operand data to the operation means, performing operations by the operation means and generating the stored address of the operation result data by the address generating means, and storing the operation result data output from the operation means in the data storage means.

BRIEF DESCRIPTION OF THE DRAWING(S)

The above objects and advantages of the present invention will become more apparent by describing in detail a preferred embodiment thereof with reference to the attached drawings in which:

FIG. 11 shows instructions for matrix operations used for the digital signal processor according to the present invention;

FIGS. 12A through 12K show the formats of the instructions for the matrix operations;

FIGS. 13A through 13C show examples of a matrix multiplication;

Figure 17:
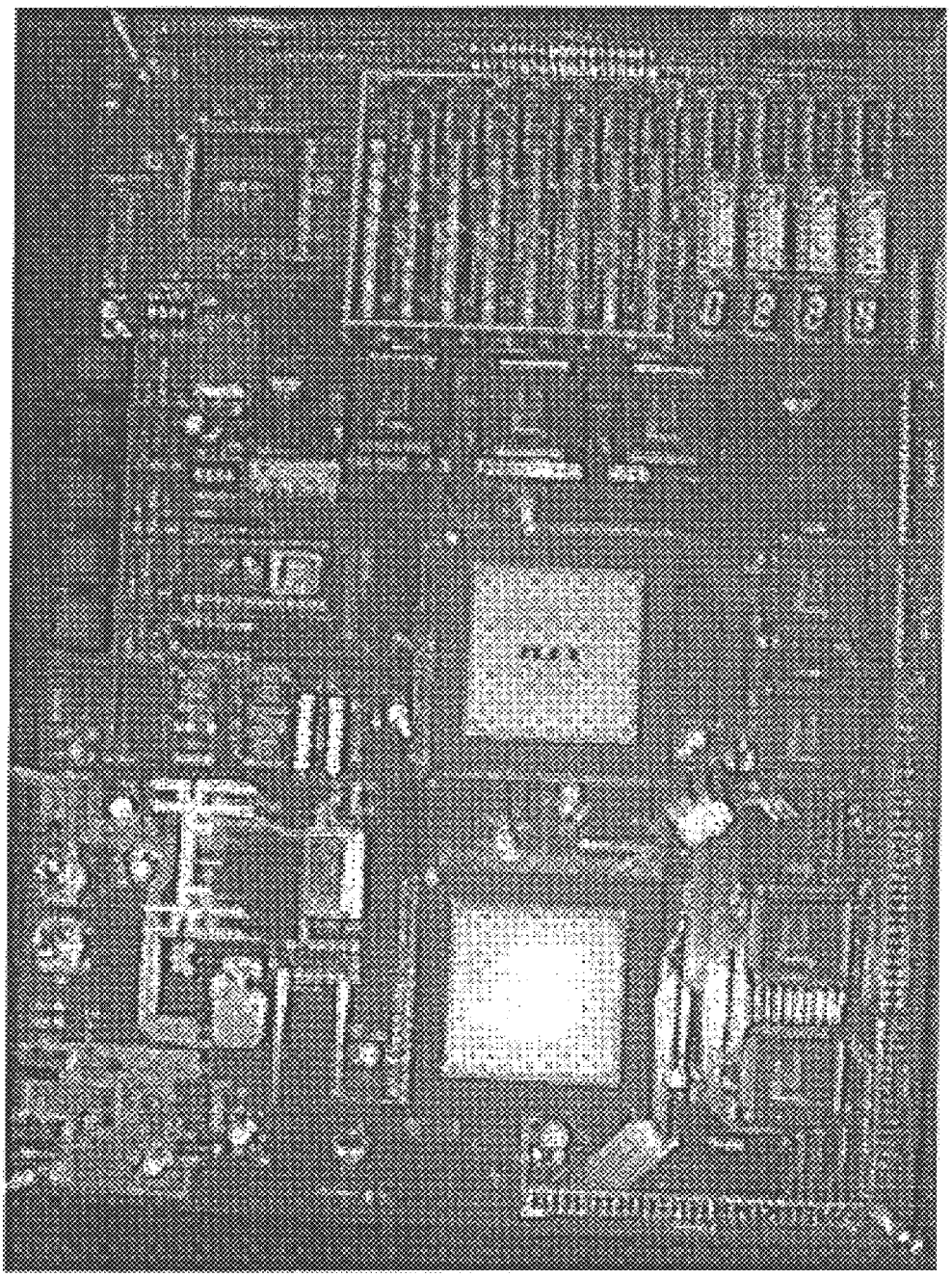

FIG. 16 compares the size of a program applied to a general digital signal processor with the size of a program applied to the digital signal processor according to the present invention; and FIG. 17 shows a board for a test of the digital signal processor according to the present invention.

DESCRIPTION OF THE PREFERRED EMBODIMENTS

Figure 1:
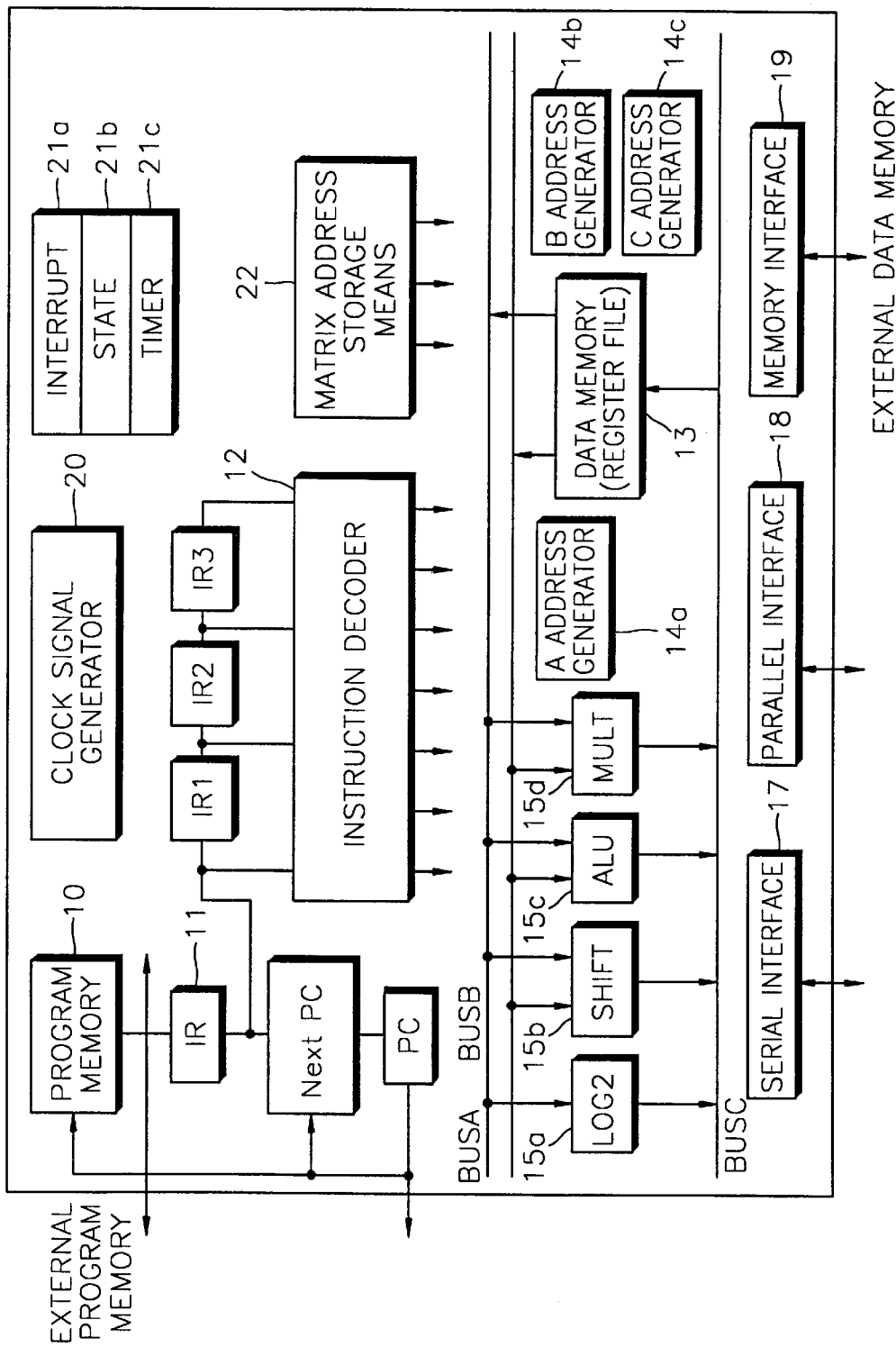
FIG. 1 is a block diagram of a digital signal processor according to the present invention.

FIG. 1 is a block diagram of a digital signal processor according to the present invention.

A signal processing algorithm is stored in a program memory 10 and instructions read from the program memory 10 are stored in an instruction register (IR) 11. The instructions stored in the instruction register 11 are analyzed by an instruction decoder 12. Accordingly, control signals required for the respective functional blocks are generated. A data memory 13 is preferably in the form of a register file having two outputs and one input. An A address generator 14a and a B address generator 14b for designating two data items to be output from the data memory 13, and a C address generator 14c for designating a place in which the calculation results obtained by operation blocks such as a LOG2 15a, SHIFT 15b, ALU 15c, and MULT 15d are stored are included in the digital signal processor. A serial interface 17, a parallel interface 18, and a memory interface 19, for performing communications with the outside, are included in the digital signal processor. A clock signal generator 20 for providing clock signals to an internal processor, registers 21a and 21b for showing interrupts and the state of the processor, and a timer 21c for generating interrupts at intervals of a certain time are included in the digital signal processor.

A matrix address storage means 22 manages and stores the addresses of various matrices.

In many cases, a digital signal processing algorithm can be more effectively represented in the form of a matrix. Therefore, it is possible to represent the digital signal processing algorithm performed by the digital signal processor using a small memory by expressing and executing matrix representations and operations in an instruction level.

Figures 2, 3:
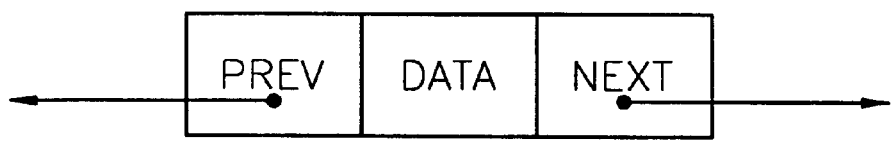
FIG. 2 shows a method of matrix data representation.
FIG. 3 shows the basic structure of a circular linked list.

According to the method of matrix data representations shown in FIG. 2, since it is possible to set one vector variable with respect to various data items, it is possible to replace various instructions having scalar variables by an instruction having the vector variable. If the 3×3 matrix multiplication shown in FIG. 2 is represented by the instructions of the conventional digital signal processor, various instructions will be necessary.

FIG. 3 shows the basic structure of a circular linked list. "PREV" and "NEXT" designate previous data and next data, respectively. Immediate data values are stored in "DATA". When a number of elements corresponding to the number of necessary data items are linked to each other, a list shown in FIG. 4 is obtained.

Figure 4:
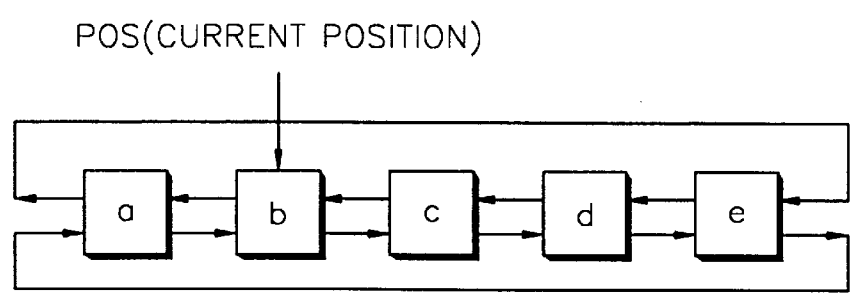
FIG. 4 shows the circular linked list conceptually.

FIG. 4 shows a circular linked list having data items "a", "b", "c", "d", and "e". Here, POS denotes currently used data, which is actually a memory address in which the data is stored.

Figure 5:
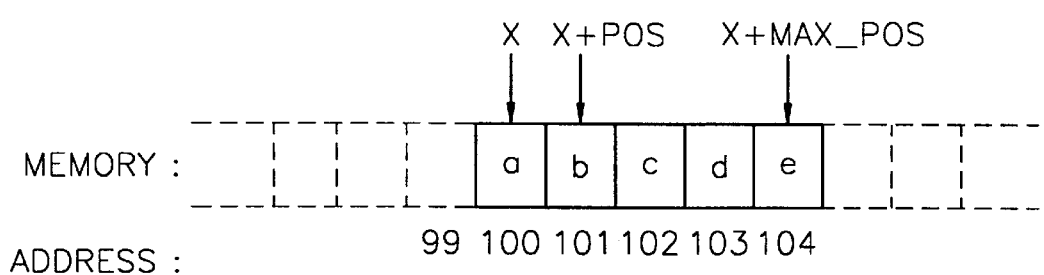
FIG. 5 shows an example of the circular linked list realized in a real memory.

In the present invention, the circular linked list having the basic structure is realized in a real hardware memory as shown in FIG. 5. It is possible to realize the circular linked list using a pointer in a high level program language such as C. However, a circular linked list realized by a high level program language is represented not to be suitable for hardware resources when the circular linked list is compiled by hardware-dependent instructions. Accordingly, a circular linked list realized by a high level program language increases overhead for hardware, which is not desirable in terms of hardware design. Therefore, the circular linked list having the basic structure is implemented using a structure of continuous memories, in the present invention.

In FIG. 5, "X" and "POS" denote a memory address showing the start of a list and the position, with respect to "X", of data that is currently being processed, respectively. Therefore, the address of the current data of FIG. 4 is obtained by adding "POS" to "X". It is possible to reduce the size of a "POS" register not by recording the absolute address of the current data in "POS" but by recording the relative distance from "X". "MAX_POS" denotes the maximum position of data items stored in the list. Therefore, the address of the last data of the list is obtained by adding "MAX_POS" to "X".

Many "X", "POS", and "MAX_POS" values are stored and used for the matrix operations. These values are stored in the matrix address storage means 22 of FIG. 1, the structure of which is shown in detail in FIG. 7.

Figure 6:
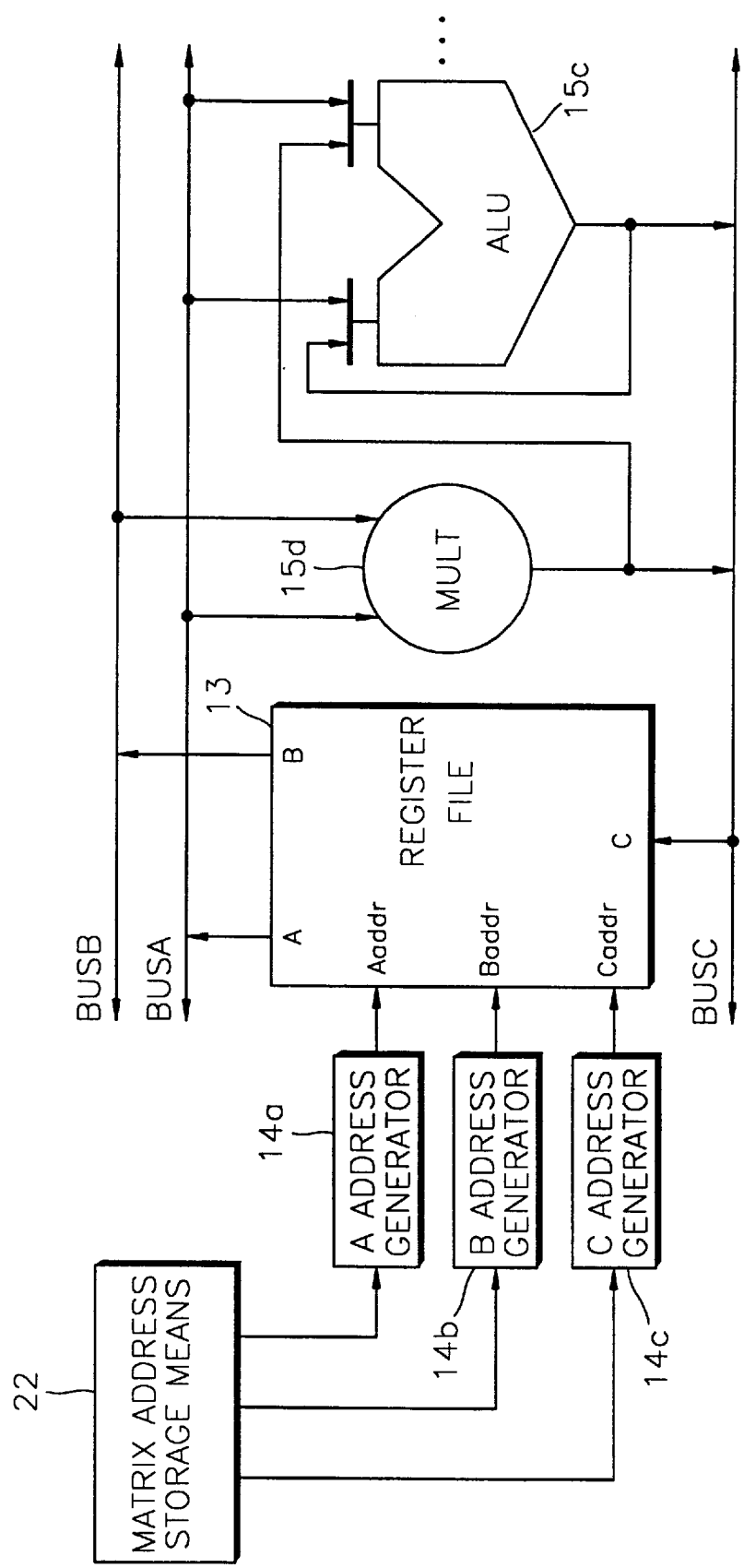
FIG. 6 is a block diagram of a matrix operation apparatus according to the present invention.

FIG. 6 shows a relationship between an operator, a register file 13, and the address generator of the register file in detail. In FIG. 6, the operator includes a multiplier 15d and an arithmetic logic unit (ALU) 15c. The address generator includes the matrix address storage means 22, the A address generator 14a, the B address generator 14b, and the C address generator 14c.

The A address generator 14a and the B address generator 14b generate the addresses of the data items input to the operator. The data items corresponding to the generated addresses are output from the register file 13 and transferred to the operator through BUSA and BUSB. The operator performs instructions corresponding to instruction words and transmits operation results through BUSC. Then, the operation results are stored in the position corresponding to the address generated by the C address generator 14c in the register file 13. Such a series of processes are repeated a number of times corresponding to the size of the matrix during the matrix operation.

Figure 7:
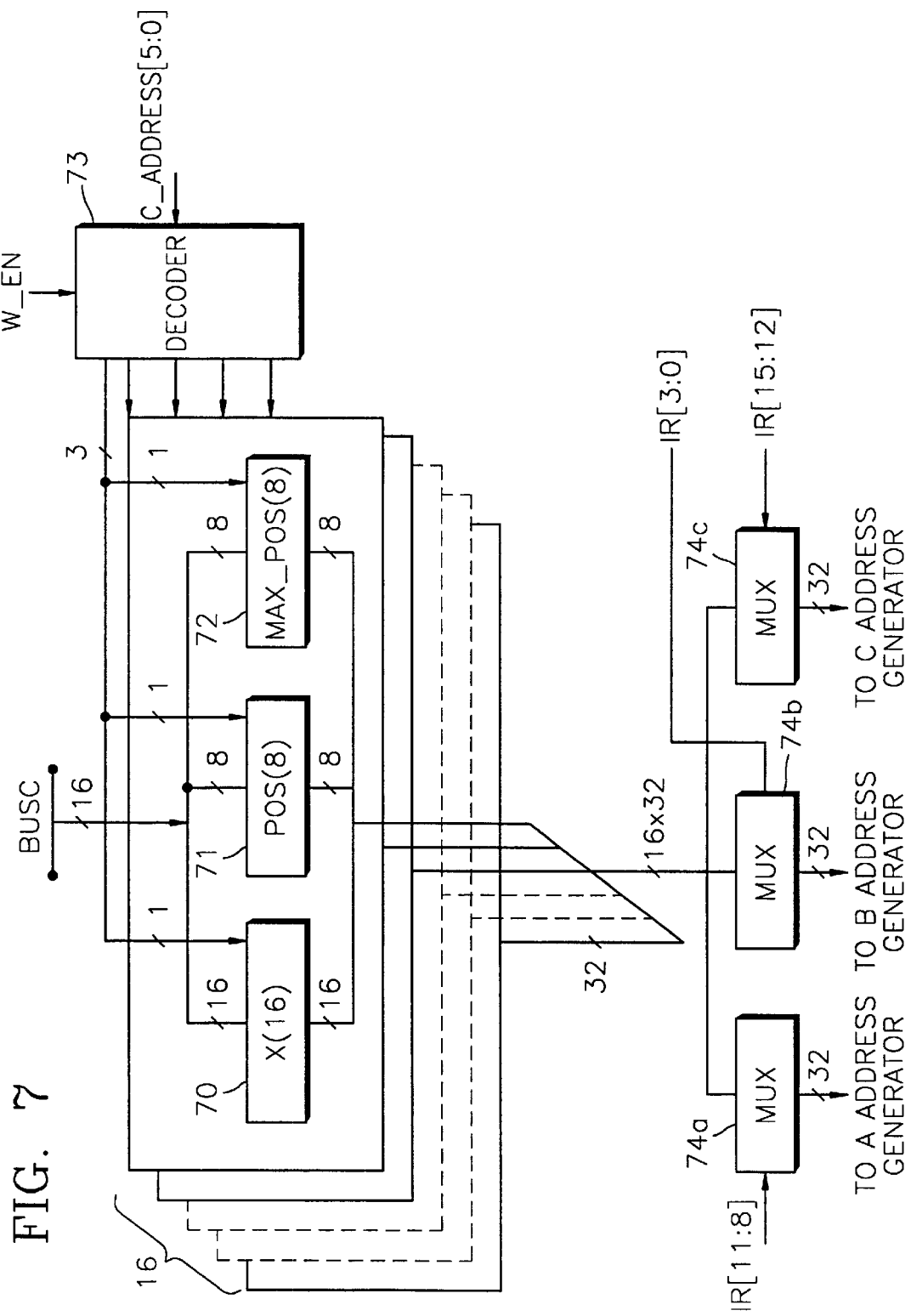
FIG. 7 is a block diagram of a matrix address storage means.

FIG. 7 shows the matrix address storage means 22 in more detail. The value transmitted through the BUSC is input to the register of the address generated by the C address generator 14c. A decoder 73 interprets the address generated by the C address generator 14c and determines the register in which the value transmitted through BUSC is to be stored. Since the matrix address storage means 22 supports sixteen matrix addresses in a preferred embodiment of the present invention, the number of each of an X register 70, a POS register 71, and a MAX_POS register 72 is sixteen. The X register 70, which is constituted of sixteen bits, supports a maximum addresses of sixteen bits. The POS register 71 and the MAX_POS register 72, each of which is constituted of eight bits, can realize a list having a maximum of 256 data items, respectively. Also, the values of the registers can be selected and read or written.

The value output from the matrix address storage means 22 is determined by the value of the instruction register IR. Each of multiplexers 74a, 74b, and 74c selects one among the sixteen matrix addresses in accordance with the value stored in the instruction register IR. Each of the address generators 14a, 14b, and 14c generates a final address in accordance with the selected matrix address.

Figure 8:
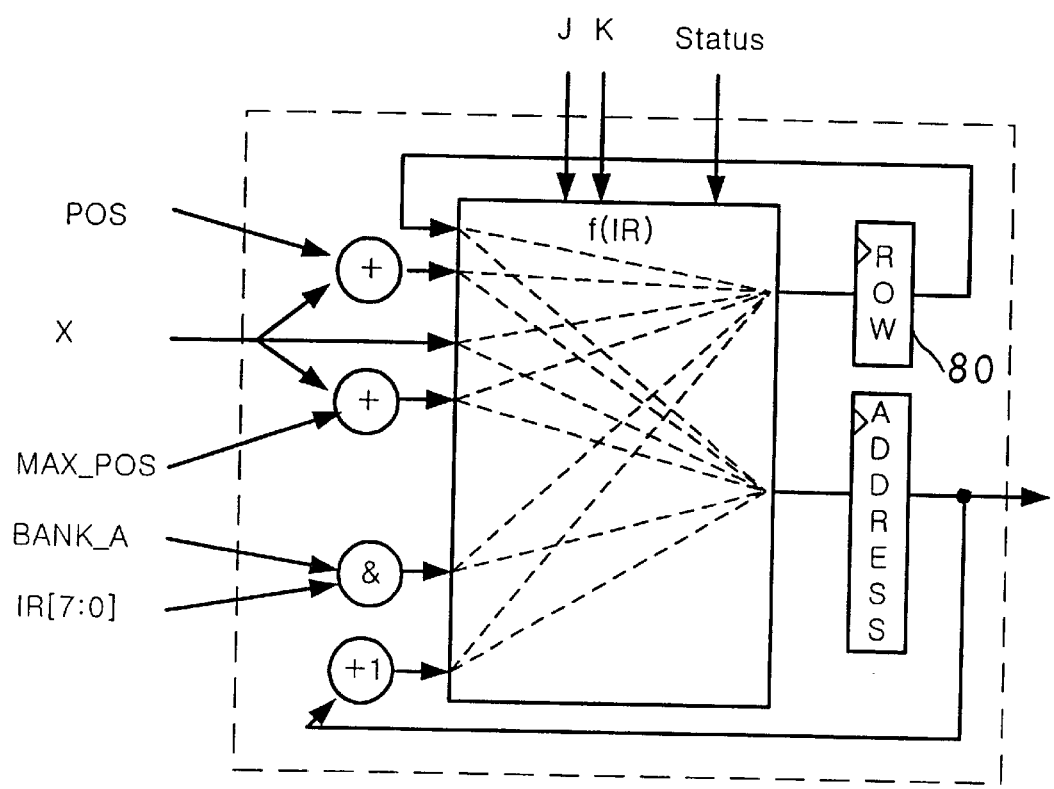
FIG. 8 is a block diagram of an A address generator.

FIG. 8 is a block diagram of the A address generator 14a. The A address generator 14a is a block for generating an address for selecting the data output to BUSA in the register file (the data memory) 13. When the instruction word stored in the instruction register 11 is not for the matrix operation, the A address generator 14a generates sixteen bit addresses obtained by linking the values stored in a BANK_A register for storing the high level addresses of data to the upper eight bit values of the IR register and outputs the generated sixteen bit addresses. When the instruction word stored in the instruction register 11 is for the matrix operation, the A address generator 14a generates an address obtained by adding "POS" to "X" and the address obtained by adding 1 to the above address "POS"+"X". When the obtained value is larger than "X"+"MAX_POS", the "X" address is selected and output. Since it is necessary that a row be repeatedly selected in the case of matrix multiplication, the A address generator 14a includes a register 80 for remembering a ROW address. I, J, and K values (here, I, J, and K denote the row of the resultant value, the column of the resultant value, and the index of the multiplication operation, respectively), which are inputs required for the matrix operation are reduced by one during the matrix operation. Only the "J" and "K" inputs are used in the A address generator 14a.

Figure 9:
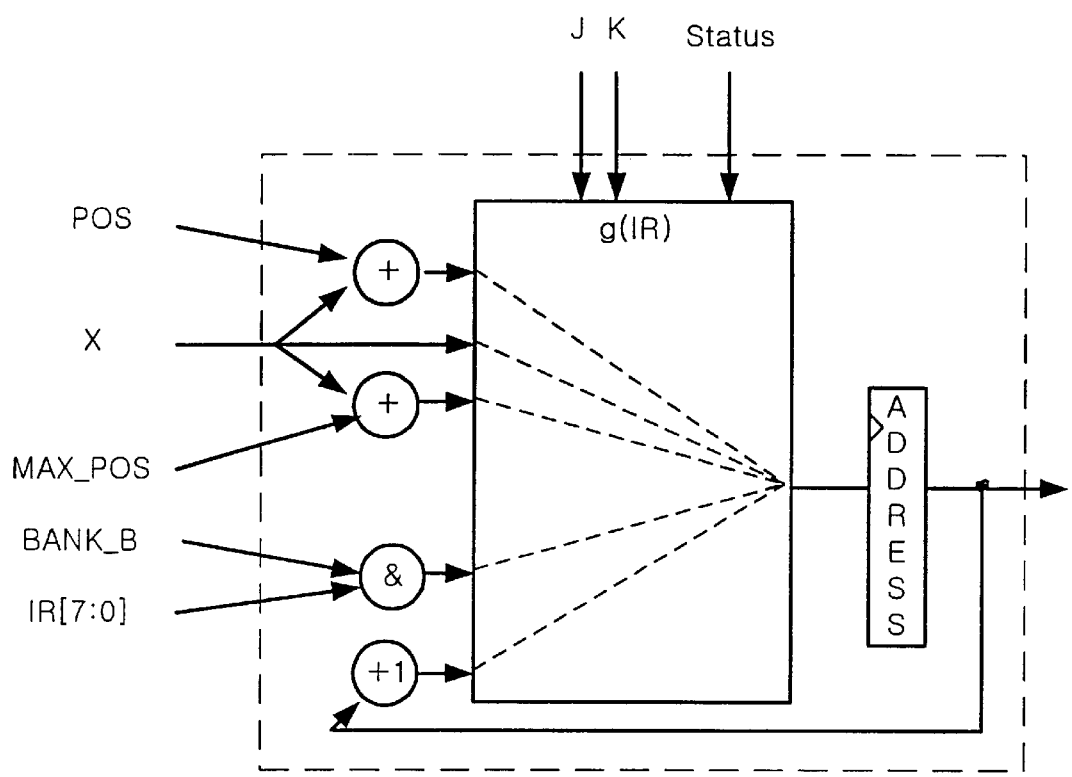
FIG. 9 is a block diagram of a B address generator.

FIG. 9 is a block diagram of the B address generator 14b. The B address generator 14b is a block for generating an address for selecting the data output to the BUSB in the register file (data memory) 13. The B address generator 14b is different from the A address generator 14a only in that a register for generating the "ROW" address is not included.

Figure 10:
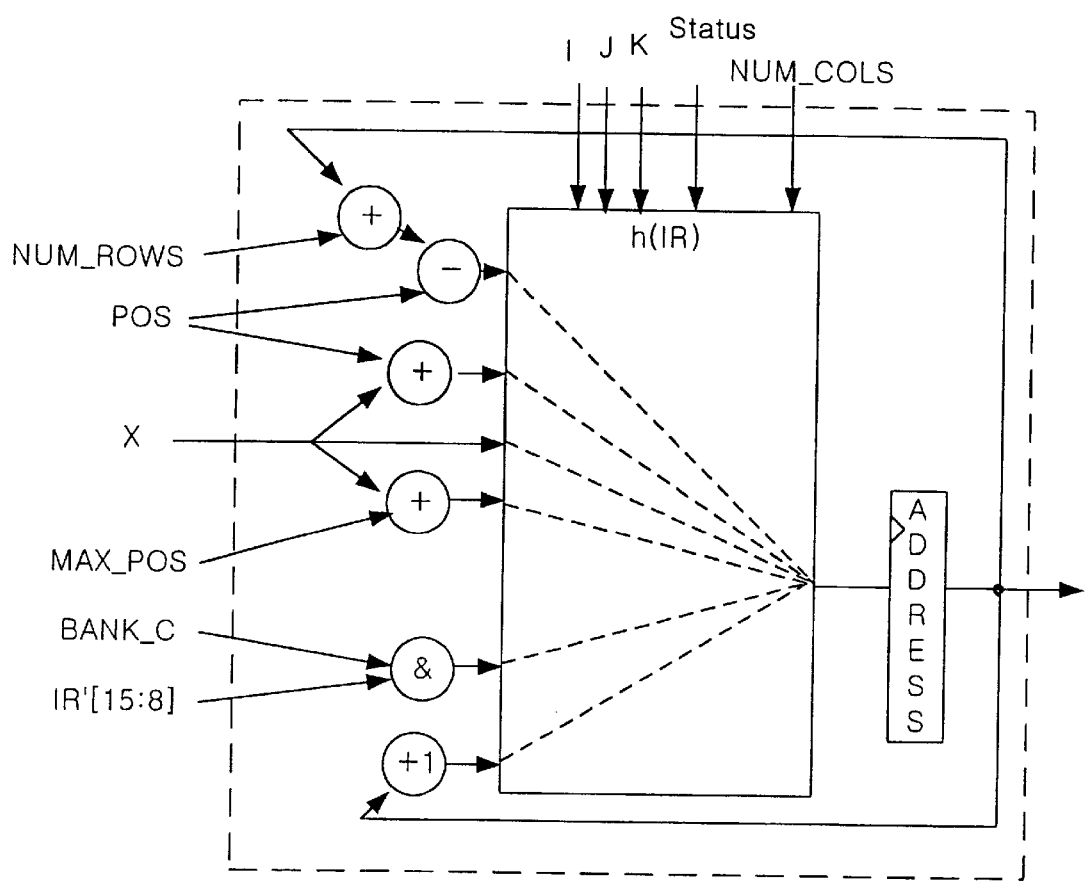
FIG. 10 is a block diagram of a C address generator.
Figure 12E:
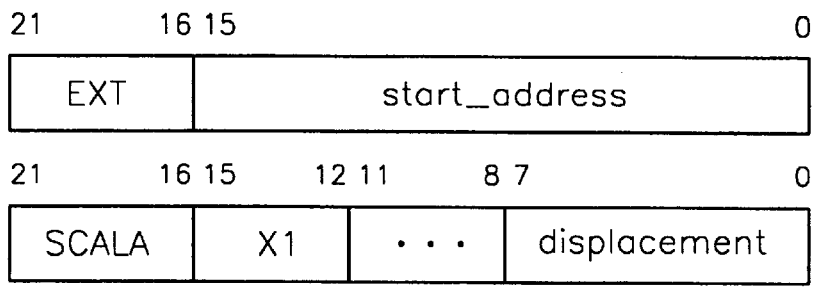
Figure 12F:
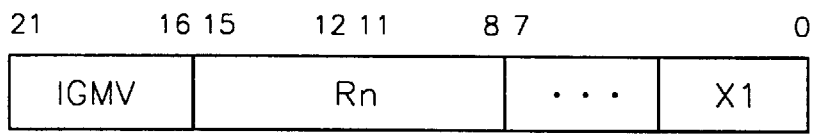
Figure 12G:
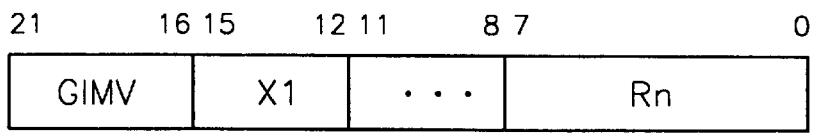
Figure 12H:
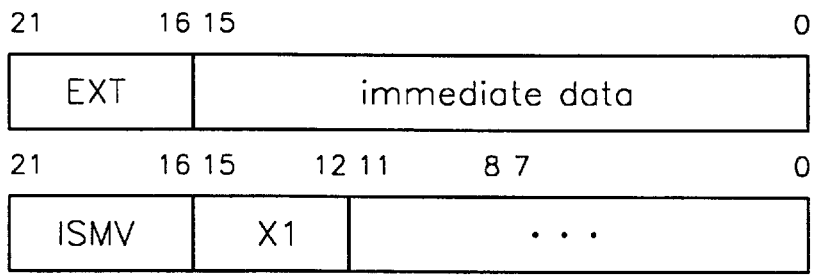
Figure 12I:
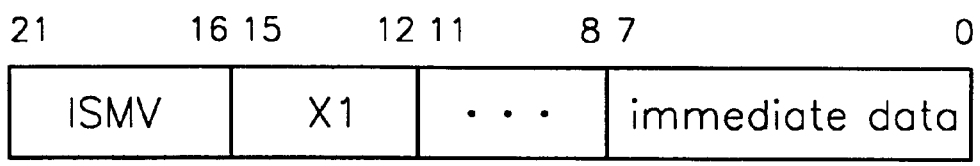
Figure 12J:
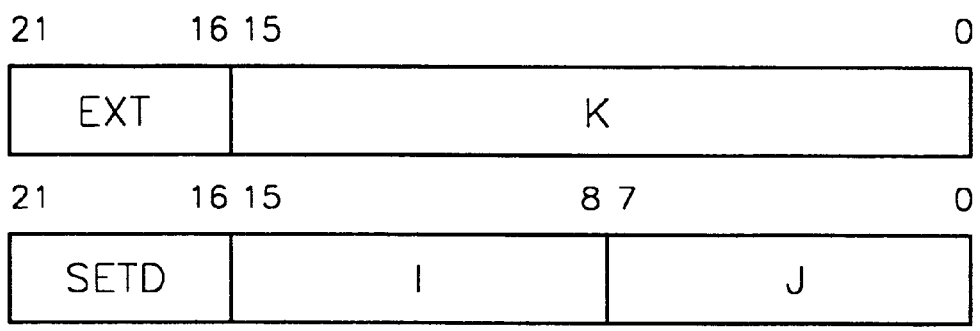
Figure 12K:
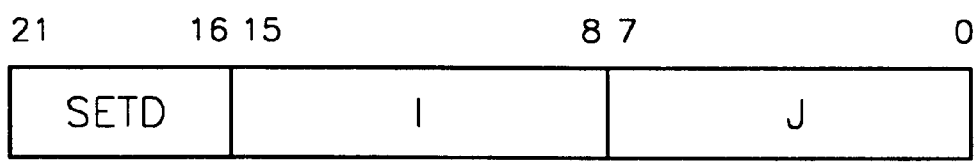

FIG. 10 is a block diagram of the C address generator 14c. The C address generator 14c is a block for generating an address for selecting the position of the data stored in the BUSC in the register file (the data memory) 13. The I, J, and K values are used in the C address generator. The values of "NUM_ROWS" and "NUM_COLS" registers for determining the sizes of the matrices are used in the C address generator 14c. The values of the registers are required for performing instruction words (TRANSA) of exchanging the columns and the rows of the matrix and storing the exchanged columns and rows. This is because it is necessary to increase the address value by the number of columns (NUM_COLS). When the increased address value becomes larger than the maximum address value "X"+"MAX_POS", "ADDRESS"+"NUM_ROWS"−"POS" is output. Since the C address generator 14c generates an address in an EX state among the pipeline states shown in FIG. 15, the final output is generated two clock periods later than the addresses generated by the A address generator 14a and the B address generator 14b, which will be omitted in FIG. 10.

FIG. 11 shows instructions provided for the matrix operation in an embodiment of the digital signal processor according to the present invention shown in FIG. 1. The instructions support all types of matrix operations and data transmission between matrices and common data values.

Matrix operation instruction forms are shown in FIGS. 12A through 12K.

When "EXT" is at the head of an instruction word, the instruction word and the next instruction word linked thereto form one instruction word. Namely, LOADA and STOREA form a two-word instruction. However, ISMV and SETD form a two-word command or a single-word command.

The ISMV command stores immediate data in a specific register. When the required immediate data can be represented by eight bits, a single-word instruction is used. When a bit space greater than or equal to eight bits is necessary, a two-word instruction is used.

The SETD instruction determines the size required for the matrix operation. Matrix multiplication is represented by a two-word instruction since the I, J, and K values are required. A matrix addition is represented by a single-word instruction since only the I and J values are required.

The multiplication (MULTA) between matrices shown in FIG. 13A will now be described. Operands used in a 2×2 matrix multiplication stored in the data memory 13 of FIG. 1 are shown in FIG. 13B. The addresses of the matrix data X1, X2, and X3 stored in the matrix address storage means 22 of FIG. 1 are shown in FIG. 13C.

Figure 14:
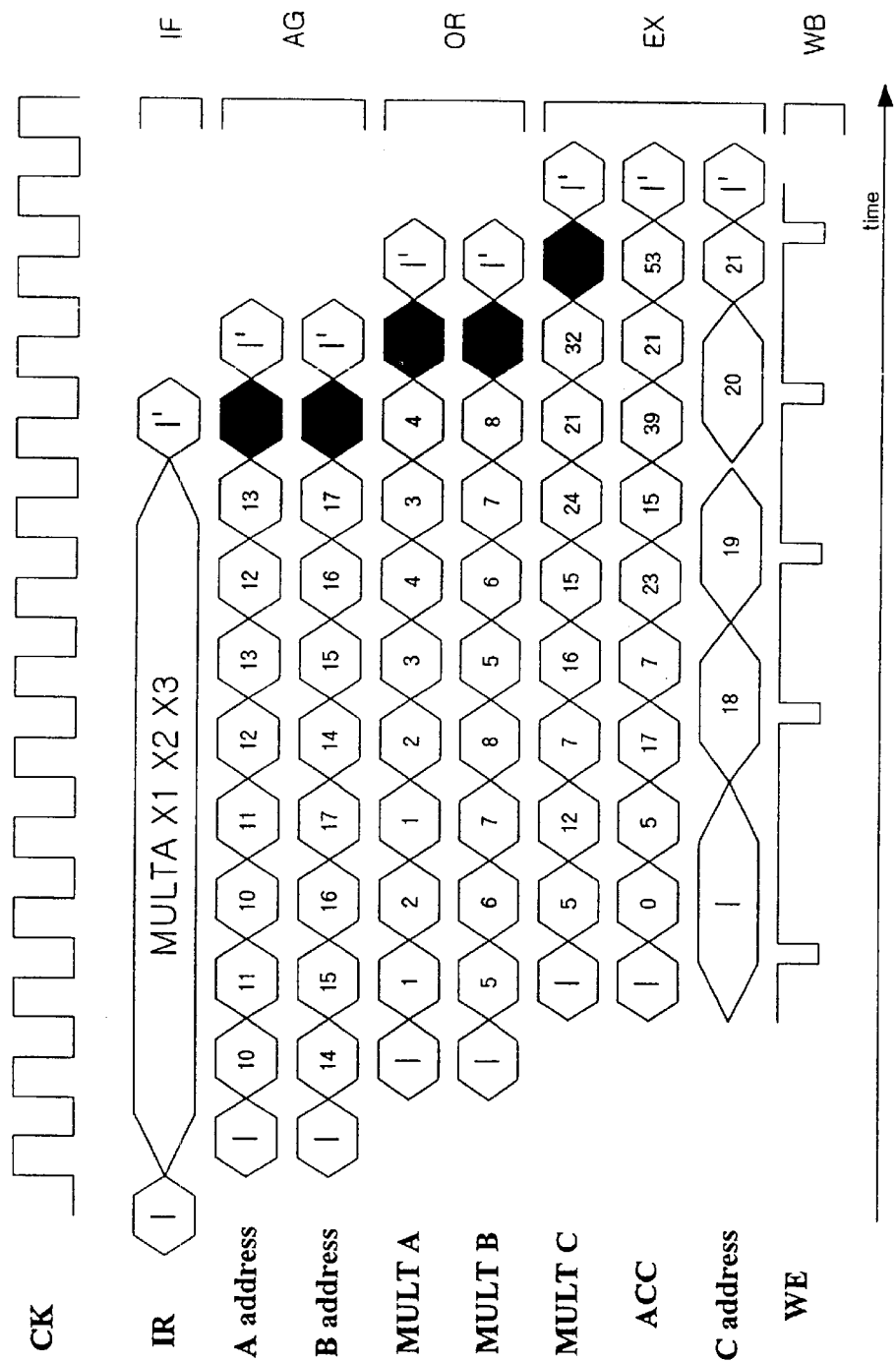
FIG. 14 is a timing diagram of the matrix multiplication shown in FIG. 13A.

The operation state of the multiplication between the matrices shown in FIG. 13A can be represented as shown in FIG. 14. An embodiment of the digital signal processor according to the present invention is realized in the form of a pipeline. The operation of the multiplication between the matrices shown in FIG. 14 is performed for a time of nine clock periods. In FIG. 14, I and I' represent a previous instruction word and an instruction word next to a MULTA instruction word. WE denotes a control signal for storing operation results in the register file (data memory) 13. Each address generator sequentially generates addresses to be suitable for the matrix operation.

Figure 15:
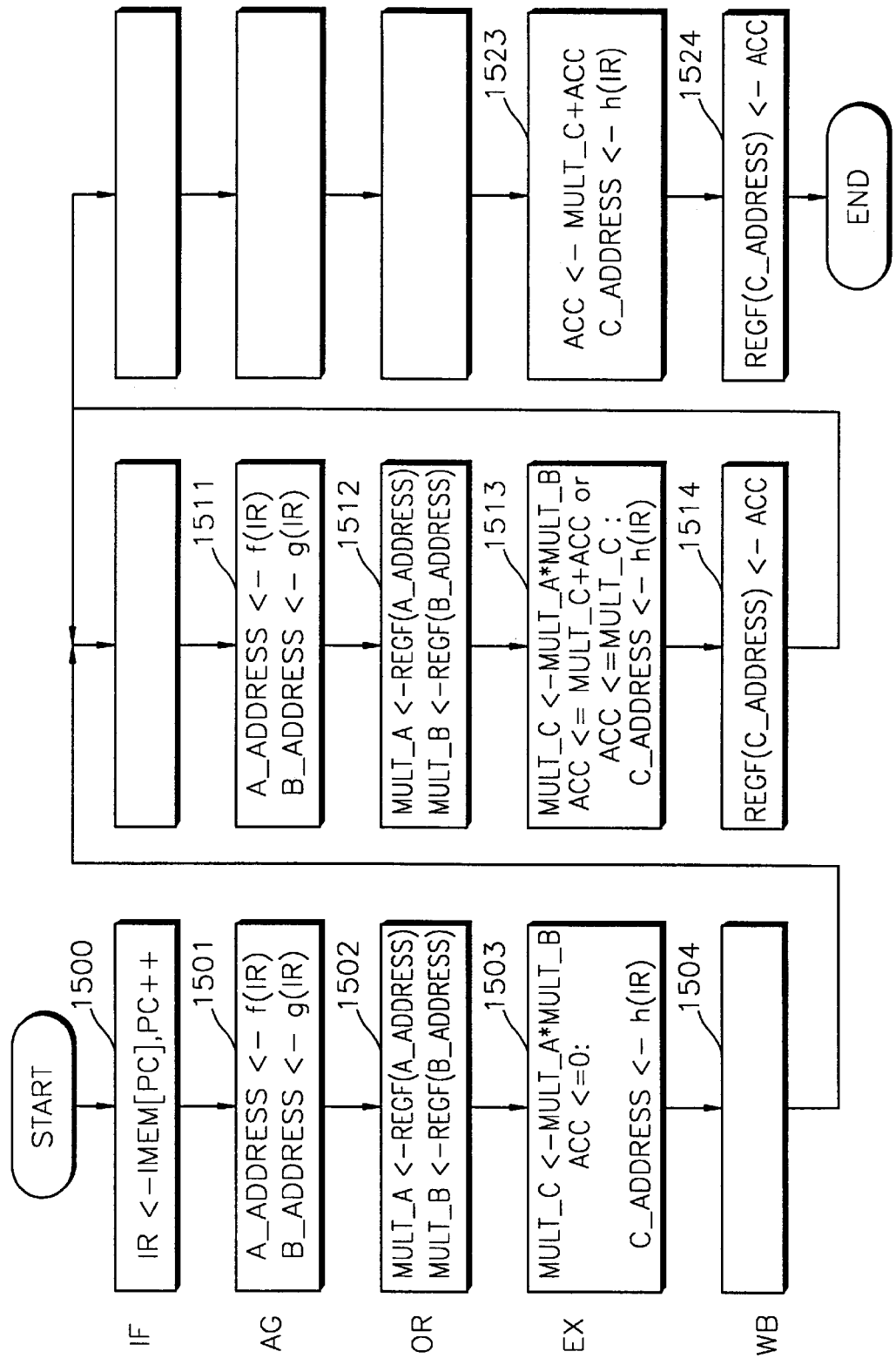
FIG. 15 shows the order in which the matrix multiplication is performed.

FIG. 15 shows the pipeline structure of an embodiment of the digital signal processor according to the present invention in the order.

The instruction word stored in the program memory 10 IMEM is stored in the instruction register 11 IR (IF) (step 1,500). The output addresses of the register file (data memory) 13 are calculated by the above-mentioned method (AG) (step 1501). f(IR) and g(IR) denote the addresses generated by the A address generator 14a and the B address generator 14b, respectively. The values are the address values generated by "X"+"POS". The data positioned in the generated addresses are moved to an operation block required by the register file (data memory) 13, that is, a multiplexer 15d (OR) (step 1502). In FIG. 15, REGF denotes the data memory 13. Two data are multiplied with each other, and the address stored in the data memory 13 are calculated (EX) (step 1503). h(IR) denotes the address generated by the C address generator 14c. The data obtained by performing an initial multiplication operation is not stored (step 1504).

The output addresses of the data memory are newly calculated and data items for the multiplication operation are moved to the multiplier 15d (steps 1511 and 1512). The data items moved to the multiplier 15d are multiplied with each other and the multiplication result MULT_C obtained in the step 1503 is added to an accumulated value (ACC) at the same time (step 1,513). When the operation of a row is completed, the accumulated value ACC is stored in the input address of the data memory 13 (WB) (step 1,514). Such operations are repeated until the matrix operation is completely performed.

After the multiplication operation is completed, the finally obtained multiplication result MULT_C is added to the accumulation value ACC and stored in the data memory 13 (steps 1523 and 1524). This series of operations is performed in a pipeline.

FIG. 16 compares the size of a program applied to a general digital signal processor with the size of a program applied to the digital signal processor according to the present invention. It is noted from FIG. 16 that the size of the program performed by the digital signal processor LP-DSP according to the present invention is smaller than the size of the program performed by a general digital signal processor G-DSP. The present invention can be more effectively used when the algorithm in which the matrix representation is effectively used is performed.

It is possible to more effectively program instruction words by the conventional signal processor by applying the present invention to an auditory digital hearing aid for which both low power consumption and small system size are essential. In order to verify the performance of the present invention, a printed circuit board (PCB) for a test is manufactured and a design using a field programmable gate array (FPGA) is completed. FIG. 17 shows a board for the test, which is designed by the above method. It is possible to note that the digital signal processor according to the present invention can perfectly perform given functions even though the program memory having the small capacity is included.

It is possible to reduce the size of the program memory in the digital signal processor by providing means for effectively representing the digital signal processing algorithm. Accordingly, it is possible to reduce the power consumption for reading the program memory, to thus operate electronic products for a long time.

What is claimed is:

1. An apparatus included in a digital signal processor, for performing matrix operations, comprising:
    a data storage means for storing operand data comprising matrix data in the form of a circular linked list and operation result data;
    address generating means for sequentially generating addresses required for performing matrix operations, the address generating means comprising a matrix address storage means for storing, in the form of the circular linked list, addresses of the matrix data and outputting a first matrix data address, a second matrix data address, and an operation result matrix data address according to the contents of instruction words performed by the digital signal processor, wherein the sequentially generated addresses include a series of addresses of first operand data, a series of addresses of second operand data, and a series of stored addresses of operation result data that respectively correspond to the first, second and operating result matrix data addresses, whereby the addresses are sequentially generated according to contents of the instruction words; and
    an operation means for reading data positioned in the address generated by the data storage means and performing operations according to the contents of the instruction words.

2. The apparatus of claim 1, wherein the address generating means further comprises:
    an first address generator for receiving the first matrix data address from the matrix address storage means and sequentially generating the series of addresses of the first operand data according to the instruction words;
    a second address generator for receiving the second matrix data address from the matrix address storage means and sequentially generating the series of addresses of the second operand data according to the instruction words; and
    a third address generator for receiving the operation result matrix data address from the matrix address storage means and sequentially generating the series of stored addresses of the operation result data according to the instruction words.

3. The apparatus of claim 2, wherein the matrix address storage means comprises a plurality of matrix address register groups comprised of a first register for storing a memory address which shows the start of the circular linked list, a second register for storing a position value of currently processed data, which is a relative value with respect to the value stored in the first register, and a third register for storing the number of data items stored in the circular linked list.

4. The apparatus of claim 3, wherein the matrix address storage means further comprises a decoder for interpreting the address generated by the third address generator in order to determine the position in which the operation result obtained by the operation means is to be stored among the plurality of matrix address register groups.

5. The apparatus of claim 3, wherein the matrix address storage means further comprises a first multiplexer for selecting the first matrix data address according to the contents of the instruction words, a second multiplexer for selecting the second matrix data address according to the contents of the instruction words, and a third multiplexer for selecting the operation result matrix data address according to the contents of the instruction words, among the addresses of the matrix data stored in the plurality of matrix address register groups.

6. The apparatus of claim 3, wherein the first address generator receives the first matrix data address, adds the second register value to the first register value and outputs the addition result according to the instruction words, continuously outputs the address value obtained by adding 1 to the address value generated immediately prior, and lastly outputs the first register value when the address value is larger than the value obtained by adding the third register value to the first register value.

7. The apparatus of claim 2, wherein the first address generator comprises a register associated with a row address for outputting the same address value during a plurality of clock periods.

8. The apparatus of claim 2, wherein the first address generator comprises a scalar data generator for receiving an offset address included in the instruction words and the segment address of a segment address register, combining the segment address with the offset address, and outputting the combination result.

9. The apparatus of claim 3, wherein the second address generator receives the second matrix data address, adds the second register value to the first register value and outputs the addition result according to the instruction words, continuously outputs the address value obtained by adding 1 to the address value generated immediately prior, and lastly outputs the first register value when the address value is larger than the value obtained by adding the third register value to the first register value.

10. The apparatus of claim 2, wherein the second address generator comprises a scalar data generator for receiving an offset address included in the instruction words and the segment address of a segment address register, combining the segment address with the offset address, and outputting the combination result.

11. The apparatus of claim 3, wherein the third address generator receives the operation result matrix data address, adds the second register value to the first register value and outputs the addition result according to the instruction words, continuously outputs the address value obtained by adding 1 to the address value generated immediately prior, and lastly outputs the first register value when the address value is larger than the value obtained by adding the third register value to the first register value.

12. The apparatus of claim 3, wherein the third address generator receives a fourth register value and a fifth register value showing the size of the operation result matrix, outputs the address value obtained by adding the fifth register value to the address value generated immediately prior according to the instruction words, and outputs the address values obtained by adding the fourth register value to the address value generated immediately prior and subtracting the second register value from the address value generated immediately prior when the address value is larger than the value obtained by adding the third register value to the first register value.

13. The apparatus of claim 2, wherein the third address generator comprises a scalar data generator for receiving an offset address included in the instruction words and the segment address of a segment address register, combining the segment address with the offset address, and outputting the combination result.

14. The apparatus of claim 1, wherein the matrix address storage means comprises a plurality of matrix address register groups comprised of a first register for storing a memory address which shows the start of the circular linked list, a second register for storing the position value of currently processed data, which is a relative value with respect to the value stored in the first register, and a third register for storing the number of data items stored in the circular linked list.

15. The apparatus of claim 14, wherein the matrix address storage means further comprises a first multiplexer for selecting the first matrix data address according to the contents of the instruction words, a second multiplexer for selecting the second matrix data address according to the contents of the instruction words, and a third multiplexer for selecting the operation result matrix data address according to the contents of the instruction words, among the addresses of the matrix data stored in the plurality of matrix address register groups.

16. A digital signal processor capable of performing matrix operations, comprising:

a program memory for storing a signal processing program;

an instruction register for temporarily storing instruction words fetched by the program memory;

an instruction decoder for interpreting the instruction words stored in the instruction register and generating a control signal;

a data storage means for storing operand data including matrix data in the form of a circular linked list and operation result data;

an address generating means for sequentially generating, according to the control signal, a series of addresses of first operand data, a series of addresses of second operand data, and a series of stored addresses of operation result data for a matrix operation, wherein the address generating means comprises a matrix address storage means for storing, in the form of a circular linked list, addresses of the operand data and operation result data stored in the data storage means, and wherein each address of the first operand data, the second operand data and the operation result data corresponds to at least one data address stored in the matrix address storage means; and an operation means for reading the data positioned at the address generated by the address generating means from the data storage means and performing operations according to the control signal.

17. A method of performing a matrix operation in the digital signal processor of claim 16, wherein the instruction decoder generates a control signal corresponding to a pipeline structure, the method comprising the steps of:

fetching the instruction words stored in the program memory and temporarily storing the fetched instruction words in the instruction register;

generating the addresses of the first operand data and the addresses of the second operand data by the address generating means;

reading the first operand data and the second operand data from the data storage means and moving the first operand data and the second operand data to the operation means;

performing operations by the operation means and generating the stored address of the operation result data by the address generating means; and storing the operation result data output from the operation means in the data storage means.

* * * * *